Dec. 30, 1969

C. P. PINCKARD 3,486,939

APPARATUS FOR CLASSIFYING, CLEANING AND
COLLECTING CULINARY ITEMS

Filed Oct. 17, 1967

INVENTOR.
CHARLES P. PINCKARD

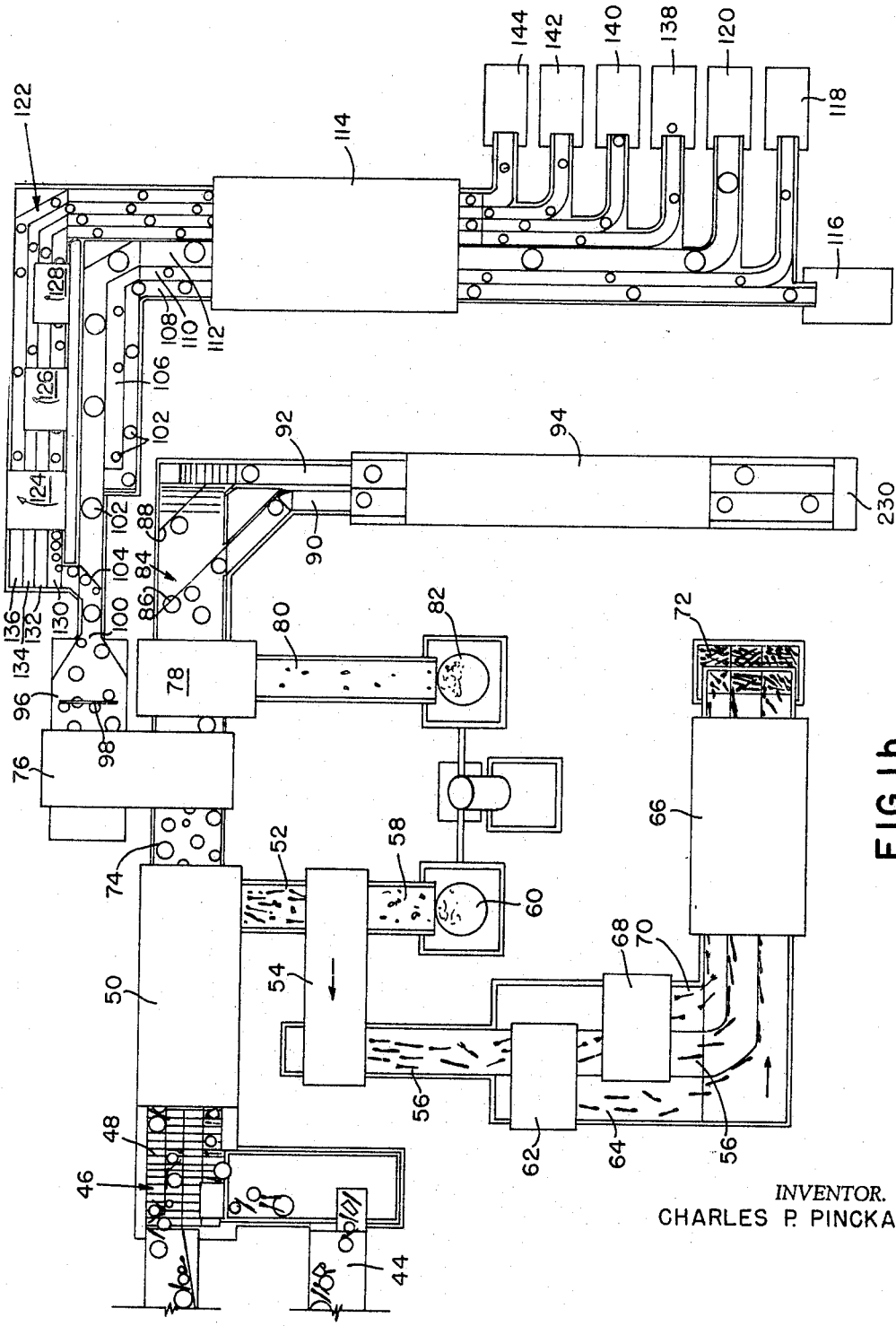

Dec. 30, 1969 C. P. PINCKARD 3,486,939
APPARATUS FOR CLASSIFYING, CLEANING AND
COLLECTING CULINARY ITEMS
Filed Oct. 17, 1967 6 Sheets-Sheet 3

INVENTOR.
CHARLES P. PINCKARD

INVENTOR.
CHARLES P. PINCKARD

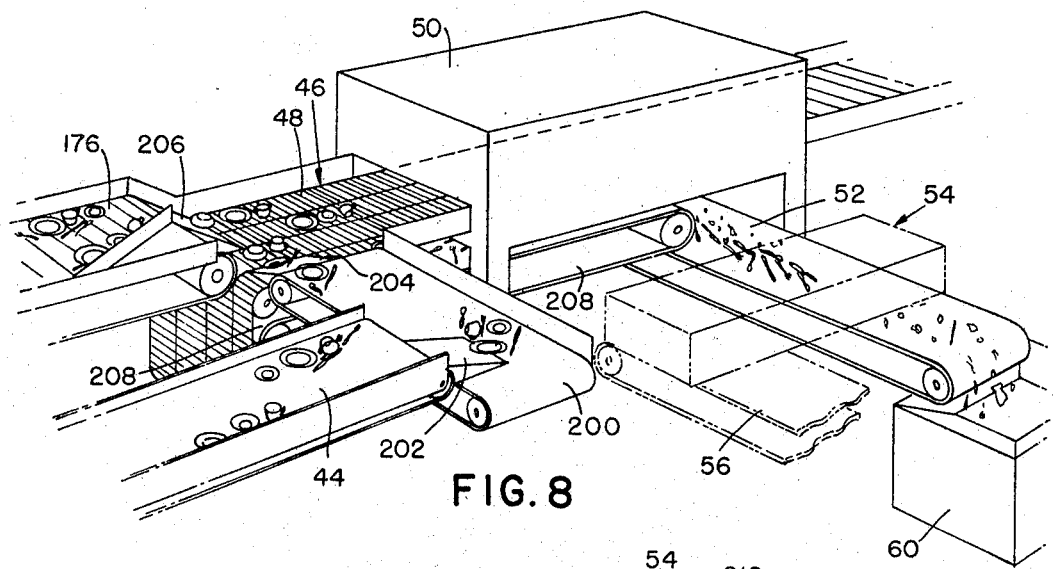
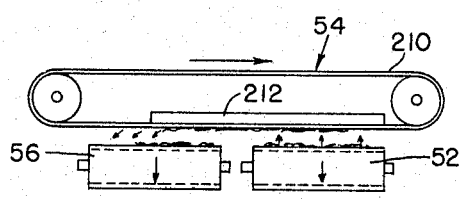
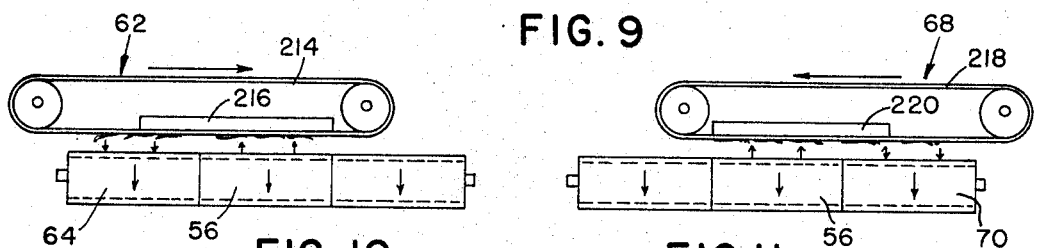
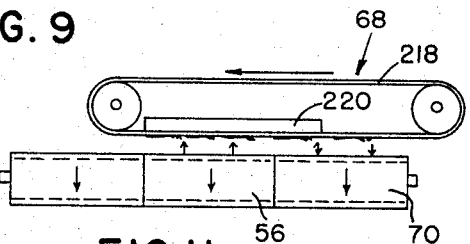
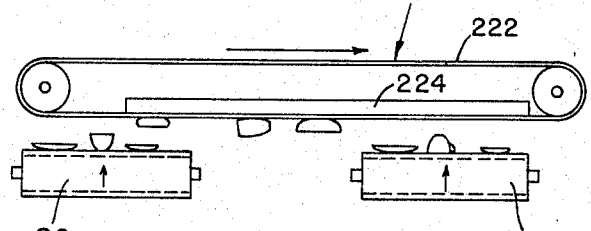
INVENTOR.
CHARLES P. PINCKARD

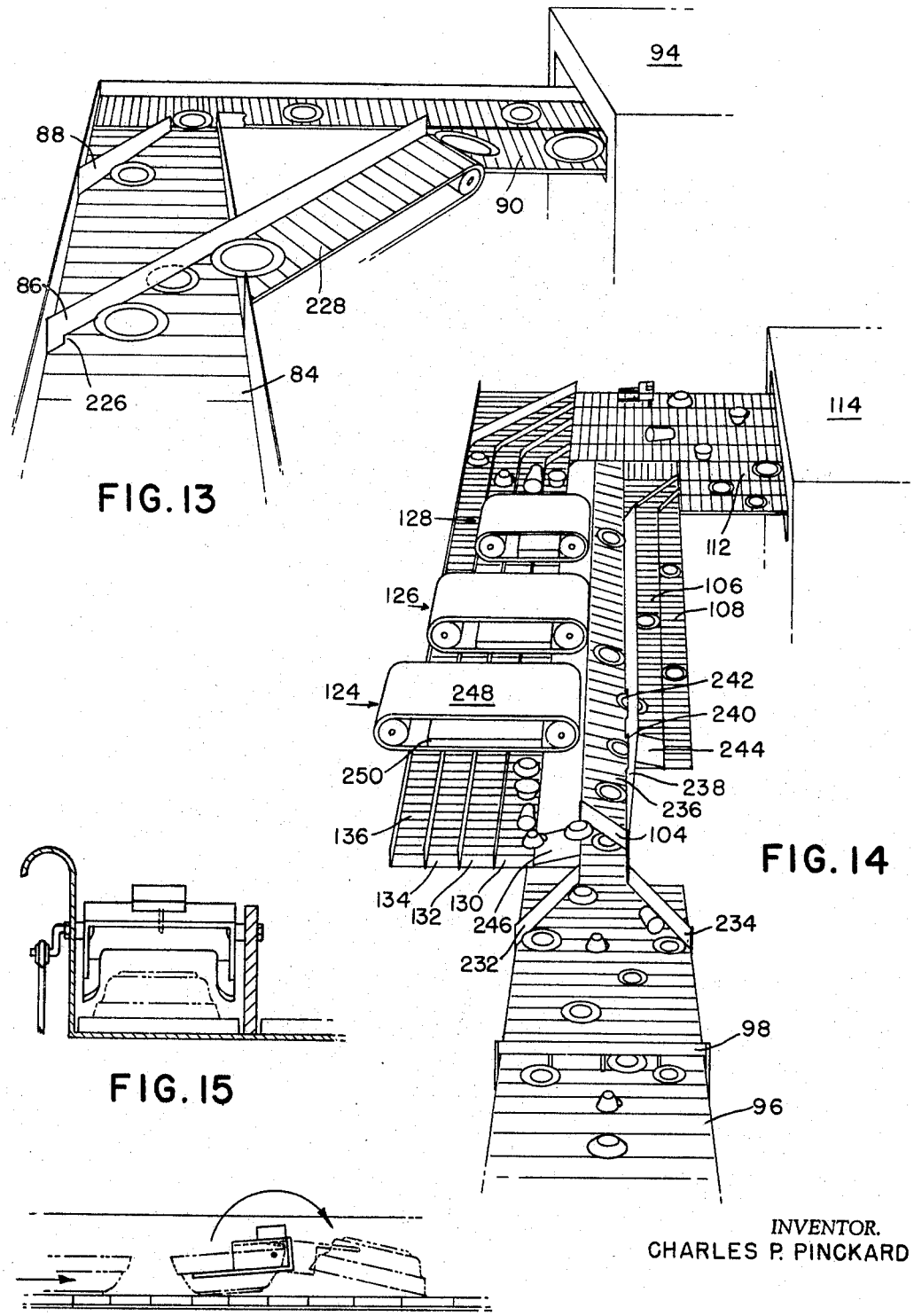

United States Patent Office 3,486,939
Patented Dec. 30, 1969

3,486,939
APPARATUS FOR CLASSIFYING, CLEANING AND COLLECTING CULINARY ITEMS
Charles P. Pinckard, 1301 E. Morehead St., Charlotte, N.C. 28204
Filed Oct. 17, 1967, Ser. No. 675,936
Int. Cl. B08b 13/00; B07c 9/00
U.S. Cl. 134—62                                  8 Claims

ABSTRACT OF THE DISCLOSURE

A method and apparatus for classifying, washing and collecting magnetically responsive chinaware and silverware items wherein a number of magnetic sorting stations with differing magnetic fields of attraction or strength selectively classify and collect chinaware and silverware items containing measured quantities of magnetically attractive material.

BACKGROUND, BRIEF SUMMARY AND OBJECTIVES OF THE INVENTION

Numerous devices and methods have been used over the years to clean and sort both table silverware and chinaware, though usually the classification and cleansing of each of these two groups are accomplished by separate equipment and through a separate operation. It is conventional practice to consider the existing chinaware and silverware commercially used and, after such consideration, to construct appropriate machinery for washing, sorting and classifying the specific articles involved. The conventional approach has consequently resulted in a variety of washing and classifyng devices of a mechanical nature which are used somewhat effectively to classify culinary articles, particularly chinaware, according to the article size, height or configuration. Additional machines have been developed for cleaning and sorting silverware articles such as that disclosed in U.S. Patent No. 3,247,858, but devices such as disclosed embody one or more mechanical sizers for classifying silverware according to like articles.

Because of the mechanical nature of such machines, the operational capacity is severely limited because of the inherent handling time involved in sensing and sizing the configuration of the object to be sorted or classified. Additionally, any number of attendants are usually required in such systems since the separation of silverware from chinaware has conventionally been accomplished by a manual sorting of these items.

With the limitations of the prior art in mind, specifically the inability of a single mechanism to wash and classify items of both silverware and chinaware, the present magnetic scullery system for washing and classifying simultaneously articles of chinaware and silverware incorporates several known components but primarily handles, sorts and classifies by magnetic stations which selectively move the respective articles to particular locations of classification, the articles themselves containing selected quantities of magnetically attractive materials according to the disclosure of application Ser. No. 675,934, filed Oct. 17, 1967, so as to respond to these magnetic stations according to the strength of the magnets used. The present invention classifies, washes and collects magnetically responsive chinaware and silverware articles and includes a grid for separating chinaware and silverware article by permitting silverware to pass through but retaining the chinaware thereon. A number of magnetic stations of various strengths classify the silverware and chinaware according to like articles so that the classified articles will be isolated from each other. Chinaware and silverware washing devices for cleansing the articles prior to their collection for subsequent distribution and use are installed following the classifying stations so that all items may be cleansed, rinsed and dried.

It is to be understood that when used throughout the present disclosure and claims, the term "chinaware" includes commonly used articles of dishware and plasticware and refers to all forms of plates, dishes, glasses, bowls, cups, containers and the like which might be used as food servicing aids. Similarly, the term "silverware" when used herein includes all eating utensils including forks, knives, spoons and the like formed from silver alloy, stainless steel, plastic, ceramic or other material.

In light of the summation above, it is a primary object of the present invention to provide a scullery system of the type described which will increase the dish and silverware handling capacity to a level heretofore never experienced in the art.

Another object of the present invention is to provide a scullery system of the type described which automates a great number of steps normally requiring manual assistance thus attributing to an appreciable reduction of labor costs in conjunction with the dish room operation.

A further object of the present invention is to provide a scullery system of the type described which will permit greater utilization of space requirements thereby affording additional immediate savings from a reduction of building costs.

A still further object of the present invention is to provide a scullery system of the type described using a novel form of chinaware and silverware conveying apparatus comprising magnetic stations of various strength which attract and sort the numerous articles of chinaware and silverware containing magnetically attractive materials.

Yet still another object of the present invention is to provide a scullery system of the type described which will permit the complete and automatic washing of both silverware and chinaware in one operation without segregation of these two groups of components prior to the sorting and washing operation.

Yet still another further object of the present invention is to provide a scullery system of the type described having novel components for classifying carrying trays, inverting the trays to dispose of chinaware and silverware carried thereon and inverting water-retaining vessels prior to the washing and rinsing operation.

These and other objects of the present invention will become more apparent to those skilled in the art upon a reading of the following detailed description taken in conjunction with the accompanying drawings wherein like characters of reference designate like parts.

FIGURE DESCRIPTION

FIG. 1B is a continuation of the scullery system operation of the present invention and plan from FIG. 1A showing the separation of the silverware articles from the chinaware articles by magnetic means and the subsequent classification and collection of both silverware and chinaware items.

FIG. 8 is a perspective fragmentary view of the chinaware and silverware collecting and separating grid through which the silverware passes for subsequent movement to a first magnetic station.

FIG. 9 is an end elevational schematic view of the first magnetic station which transfers the silverware from a first conveyor to a second conveyor and leaves the refuse on the first conveyor for eventual introduction to a pulper.

FIG. 10 is an end elevational schematic view of the second magnetic station which removes spoons from the silverware conveyor because of their particular magnetic attractiveness and for the magnet of the station and removes them to a separate conveyor.

FIG. 11 is an end elevational schematic view of a third magnetic station which removes forks from the common fork, knife and spoon conveyor and relocates them on a separate fork conveyor thus completing the silverware sorting process.

FIG. 12 is an end elevational schematic view of the first magnetic chinaware sorting station which removes all magnetically attractive chinaware from the chinaware conveyor and relocates it on an adjacent conveyor for eventual sorting.

FIG. 13 is a perspective fragmentary view of the non-magnetic chinaware sorting mechanism which sorts conventional chinaware according to the height of the various items in separate conveyor lines for movement through a washing device.

FIG. 14 is a perspective fragmentary view of the chinaware sorting mechanism which eventually sorts all like items of magnetically responsive chinaware into separate conveyor lines for subsequent washing within a dish washing apparatus.

FIG. 15 is an end elevational sectional fragmentary view of the bowl inverter utilized to invert water-retaining tapered bowls prior to rinsing by the dish washing machines.

FIG. 16 is a side elevational view of the bowl inverter shown in FIG. 15 illustrating the bowl-engaging fingers which slidably engage the bowl and invert it to an upside down position.

DETAILED DESCRIPTION

Figure 1A:
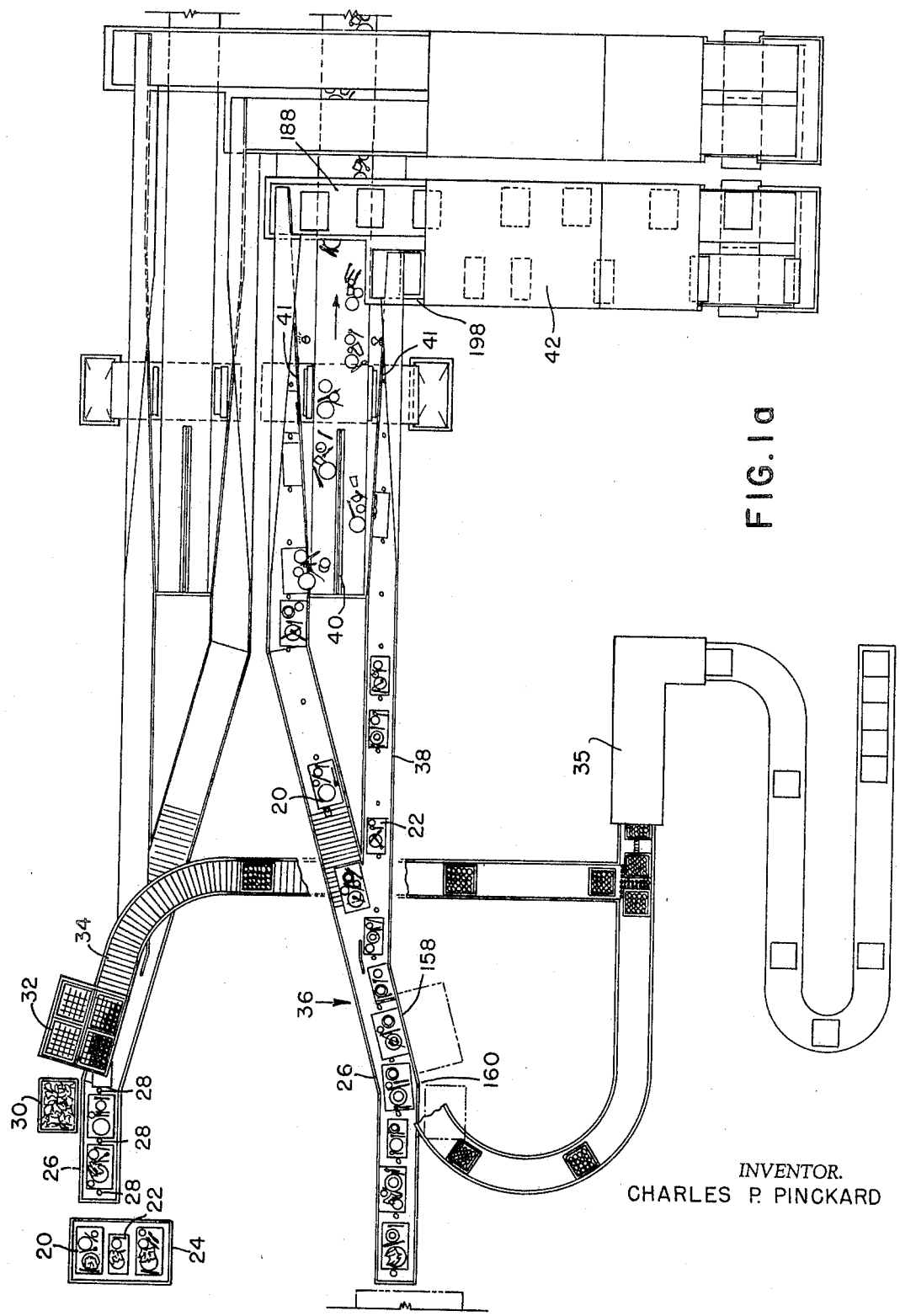
FIG. 1A is a plan view of the scullery system operation commencing where soiled tray-carried chinaware and silverware is introduced into the system and continuing through the tray-emptying and collecting mechanism.
Figure 2:
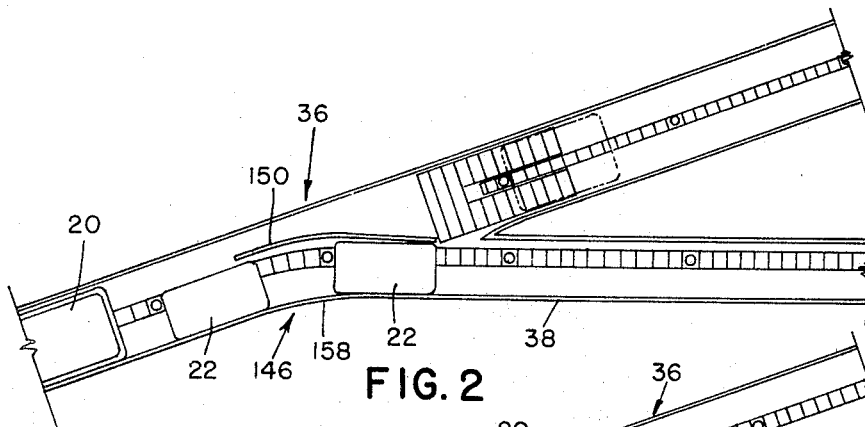
FIG. 2 is a plan view of the tray size segregating unit showing the diversion of smaller trays by a divider to a secondary tray conveyor.
Figure 3:
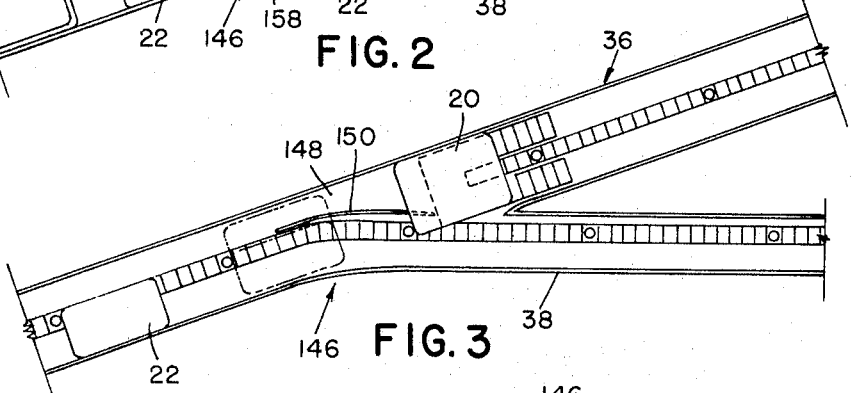
FIG. 3 is a plan view of the tray segregating unit showing the larger size trays over-riding the divider to continue along the main tray conveyor.

The entire classifying, washing and collecting procedure of the present scullery system will be first described with particular reference to FIGS. 1A and 1B showing the plan view of the complete operation. After the process has been broadly described, individual components will be particularly described for both the silverware and chinaware equipment.

Referring now to the drawings and particularly to FIGS. 1A and 1B, trays 20 and 22 of various sizes are collected on carts 24 from where they are placed onto a conveyor 26 for movement therealong by tray-feeding lugs 28. One or more attendants (not shown) will remove linen and glassware from the trays 20 and 22, the linen for placement within a collection box 30 and crates 32 which are, in turn, placed on an elevated and inclined conveyor 34 for delivery to a glassware washing apparatus 35. When the glassware leaves this apparatus, it will be collected and stored at a remote location.

After trays 20 and 22 have been cleared of the linen and glassware, they are driven along the main conveyor 26 toward a tray segregating unit generally designated 36 so that the different sized trays 20 and 22 can be separated and subsequently grouped for washing and storage. It is to be generally understood that though one path of travel through the entire system is described for the various trays and their carried components, the system is often duplicated a number of times so that a plurality of main conveyor lines feed through the entire system to double or triple the capacity of the washing and classifying of the various components.

The tray segregating unit 36 is more particularly described in FIGS. 2 through 5 and will be subsequently explained in detail, however, in the overall operational scheme of FIGS. 1A and 1B, the larger trays 20 continue along the main conveyor line 26 while the smaller trays 22 are diverted to an auxiliary conveyor 38.

The main and auxiliary conveyors 26 and 38 extend along the sides of a tray unloading table 40 as the series of trays on either side of this table are urged through tray-inverting units 41 which are particularly illustrated in FIGS. 6 and 7 and will be explained in detail subsequently. At the inverting location, the trays 20 and 22 are sequentially turned on one edge so that they remain in a vertical position until all the contained silverware and chinaware articles and any refuse are emptied onto the table 40 which is movable to convey those emptied articles forwardly along a directed path of travel (see arrow) on a conveyor 44 through the operating sequence of the system. The trays 20 and 22 are then removed from the inverting units 41 and moved while still segregated according to size, through a tray washing device 42 from whence they emerge and are received in storable containers according to size.

The emptied silverware, chinaware and refuse continues to move along the conveyor 44 developed from the movable table 40 until they eventually reach a separating apparatus 46 principally comprised of a grid 48 through which the silverware articles may pass but upon which the chinaware articles are retained and moved to a preliminary washer 50.

The separated silverware articles along with refuse which have all passed through the grid 48 and onto a conveyor below the washer unit 50 are then diverted from below the unit 50 to an intersecting conveyor 52 along which they are moved until they reach a first magnetic sorting station 54, these and subsequent sorting stations more particularly described in FIGS. 8 through 12. The primary purpose of station 54 is to lift those magnetically attractive silverware articles upward from the conveyor 52 and move them laterally (see arrow) to an additional conveyor 56 where they are again moved in unison along a predetermined path of travel. The refuse 58 which remains on conveyor 52 is moved to a pulper or pulverizing machine 60 for disposal.

The movement along conveyor 56 of all the articles of silverware causes these articles to encounter a series of magnetic stations which classify the various articles according to their own particular utensil designation. The first classifying magnetic station 62 lifts, for example, all spoons from the conveyor 56 and removes them to another conveyor 64 for subsequent introduction into a washing and rinsing machine 66. A second classifying magnetic sorting station 68 removes the forks from the conveyor 56 and introduces them into still another conveyor 70 for subsequent introduction into the washing machine 66.

Thus three separate conveyors 56, 64 and 70 contain knives, spoons and forks, and these articles are sent through the washing machine 66 from which they emerge to be received in segregated storing bins 72 for subsequent removal, distribution, storage or use.

Once the silverware articles are removed from the chinaware articles by means of the grid 46, the remaining chinaware articles are sent onward through a conveyor 74 to another magnetic sorting station 76 which removes all particles of chinaware having any magnetic particles or substances imbedded therein. Thus there remains on conveyor 74 only those nonmagnetic chinaware articles which are subsequently classified in the following manner.

A second refuse or food scrap separator 78 removes any additional food particles from the non-magnetic chinaware articles by water and/or air jets (not shown) onto conveyor 80, and these particles are then sent to another pulverizer 82 for disposal.

The non-magnetic chinaware articles proceed to a conveyor 84 upon which is retained baffles 86 and 88, these baffles permitting some articles to pass beneath because of their limited height while diverting others to sectionalized conveyors 90 and 92. Conveyors 90 and 92 move the classified articles through a dish washing apparatus 94 from whence they emerge for stacking and subsequent storage and/or use.

The magnetically attractive chinaware articles which have been deposited on a spreading table 96 by the magnetic station 76, are moved along the moving table top 96 beneath a dispersing baffle 98 and are then sequentially introduced into passageway 100 for subsequent segregation, sorting and washing. The generally flat plates 102 pass beneath a baffle 104 where they are then manually sorted according to height by inclined surfaces 106 which have openings of selected heights to further classify the plates. The classified plates are positioned on three auxiliary conveyors 108, 110 and 112 which extend into and through a dish washing apparatus 114 and outwardly therefrom to various storage bins 116, 118 and 120.

Those particles of chinaware containing magnetically attractive particles therein and which are larger or taller than the plates are diverted because of the baffle 104 to an auxiliary classifying mechanism generally designated 122 which contains three magnetic classifying stations 124, 126 and 128. Because of the varying quantities of magnetically attractive particles within each of the specific items of chinaware and the varying height differential between the dishwasher and the magnetic separators, each of the magnetic stations 124, 126 and 128 act on these articles selectively so that the remaining chinaware articles are thus channeled into four conveyors 130, 132, 134 and 136. The classification would commonly be to place bowls or short cups in the first conveyor 130, glassware or drinking tumblers in a second conveyor 132, coffee or tea cups in a third conveyor 134 and still another variation of a bowl or cup in the last conveyor 136.

The various conveyors for magnetically constructed chinaware 108, 110, 112, 130, 132, 134 and 136 all then follow a generally parallel course until they reach the final chinaware washing device 114. Similarly, those magnetically attracted items moving within conveyors 130, 132, 134 and 136 are also guided into storage bins 138, 140, 142 and 144 where they may be removed manually for subsequent use or storage.

Thus there has been generally operationally described the entire scullery system commencing with the collection of soiled dishes stacked on trays of various sizes continuing until the operation is complete and the trays, chinaware and silverware articles have been totally separated and segregated, and washed, and collected so that they my be again distributed for use. Now the individual stages embodying rather uniquely constructed devices for accomplishing the individual functions will be described in particularity though, of course, there is no intent to be restricted to those embodiments herein described as any number of variations in the individual components are possible to achieve the desired result.

As trays 20 and 22 of varying size move down conveyor 36, there is a desire to divide these trays to form two groups each of which contains trays of the same size so that they may then be collected and stored after washing at a common location. A novel tray segregating device generally designated 146 is particularly illustrated in FIGS. 2 through 5 wherein there is shown the main conveyor 36 and an auxiliary conveyor 38 which is smaller in width to accommodate those trays of smaller size. As the trays 20 and 22 move along the main conveyor 36, they approach the junction 148 of the auxiliary conveyor 38 with the main conveyor 36. A spring biased divider 150 is positioned at junction 148 and has a tapering forward edge 152 which engages a large tray 20 somewhere underneath its width so that the tray is driven upwardly over the edge 152 and causes the divider 150 to be urged downwardly against the biasing of springs 154 and 156. Thus the larger trays 20 move directly over the divider 150 and continue along their directed path of travel on conveyor 36.

The smaller trays 22 are affected somewhat differently by the divider 150 because they are urged against one edge 158 of the conveyor 36 by the curvature in the divider 150. When the smaller trays 22 approach the divider 150, they do not override the leading edge 152 but, because of their width, engage its side 162 which then urges the trays against one side of conveyor 36. Thus these trays slide within the space between the divider 150 and the wall 158 of conveyor 36 and engage the side 162 of the divider 150 which diverts the smaller trays 22 onto conveyor 38. The large and small trays are thus reliably separated.

Figure 4:
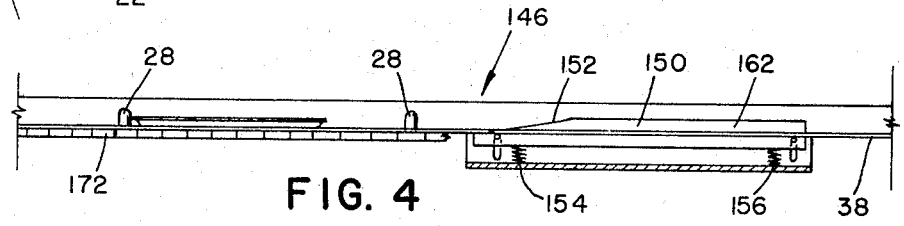
FIG. 4 is a side elevational view of the tray segregating unit divider showing the spring biasing arrangement which allows a larger sized tray to over-ride the baffle because of its inclined front portion and continue along the main conveyor.
Figure 5:
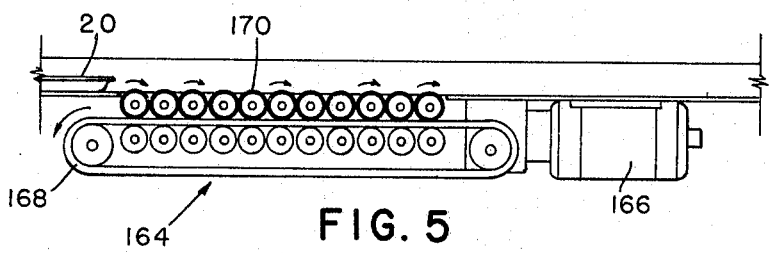
FIG. 5 is a side elevational sectional view of the conveyor drive and cooperating motor which moves the larger sized trays that have overridden the unit divider along the main tray conveyor.

It can be seen from FIG. 4 that the trays are driven along by tray feeding lugs 28 which engage the rearward edge of each tray and propel it forward. Additionally, the driving mechanism generally designated 164 for conveyor 36 is comprised of a motor 166 driving a sprocket assembly 168 which in turn rotates a plurality of drive rollers 170 that urge the tray feeding lugs 28 along a predetermined path of travel by their connection to flexible belt 172. This conveyor drive system supplies the moving power for the conveyor system up to and through the tray emptying apparatus which will be subsequently described.

Figure 6:
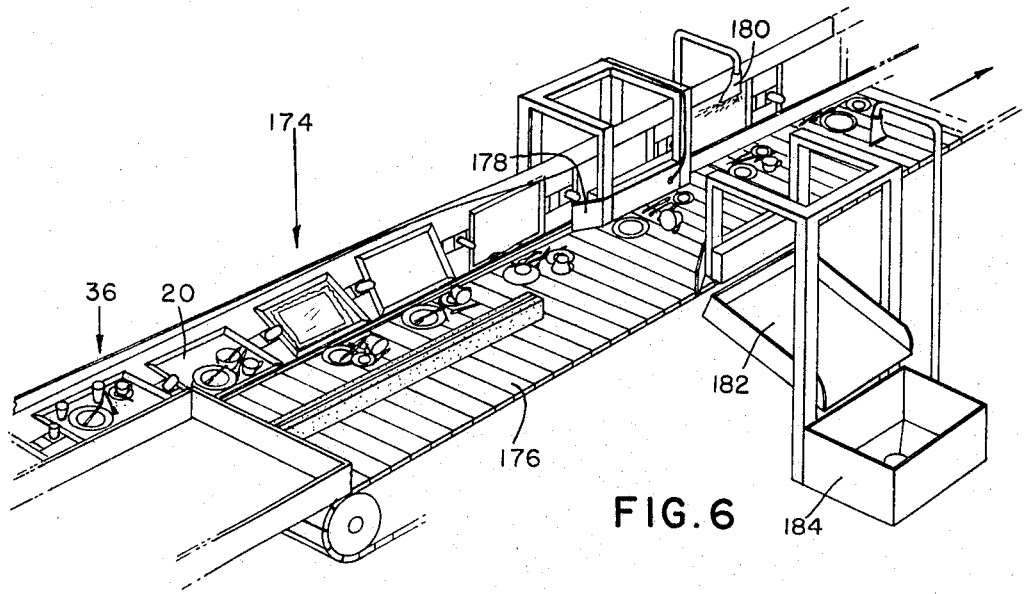
FIG. 6 is a perspective fragmentary view of the tray emptying mechanism showing one of the two converging tray inverting conveyors positioned adjacent the chinaware and silverware main conveyor belt.

The tray emptying apparatus generally designated 174 is shown in detail in FIG. 6 though there is illustrated in that figure only one of the emptying devices whereas in actuality two such emptying devices are carried in a face-to-face relationship. Conveyor 36 is constructed so that it spirals slightly and becomes inverted to a position 90 degrees away from the horizontal or commencing elevation of that conveyor. Because of the conveyor's design, the trays 20 moved therealong by the lugs 28 are inverted until they stand along a lateral edge within the conveyor thus causing the dishes and silverware carried thereon to fall on a moving table 176 which conveys the emptied articles forwardly (see arrow) for subsequent operation.

Several unique features are present in the emptying device. For example, if an article of silverware or the like is struck on the surface of the tray in the vertical position, it will move with that tray and, if undisturbed, will likely disrupt the tray unloading and stacking operation subsequently to be described. Consequently, it has been found advantageous to position a spray jet 180 above the moving trays so that a jet of water may be applied to the surface of the tray to dislodge any articles adhered thereto. Those dislodged articles then fall within a chute 182 from where they slide into a collecting box 184 for subsequent removal and washing. A deflector 178 also assists in removing articles from the inverted trays while at the same time urging the articles on the table 176 away from the trays.

After the trays have been emptied, they pass along conveyor 36 until that conveyor is terminated at a location 186 which is at the intersection of a laterally moving conveyor 188 moving beneath conveyor 36 so that the edge 190 of the tray is engaged by the conveyor 188 thus causing that tray to be pulled outwardly along the conveyor and in through a washing device 42. As the trays emerge on the conveyor 188 from the washer 42, they are flipped outwardly off the end of the conveyor onto a collecting cart 190 which has a chute 192 that receives the trays and allows them to slide within the spring-biased interior 194. A spring 196 is gradually compressed as the weight of trays accumulate above. The spring thus prevents the trays from falling from the conveyor 188 all the way to the bottom of the cart 190.

Figure 7:
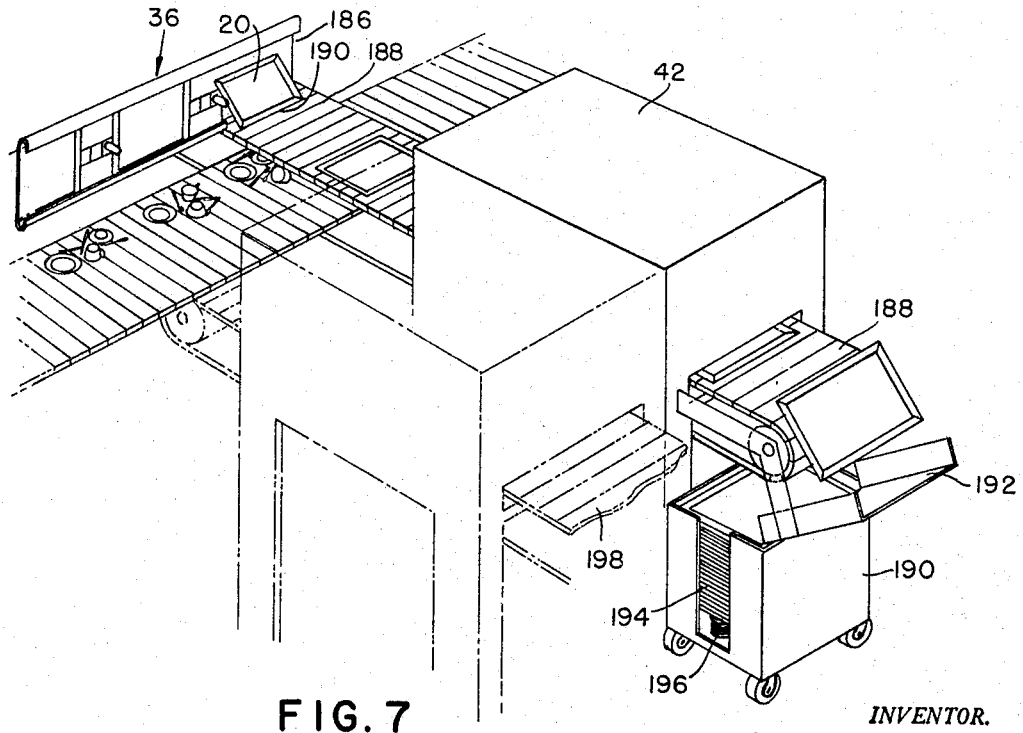
FIG. 7 is a fragmentary perspective view of the tray collecting and washing system wherein inverted and vertically disposed trays are removed from both tray collecting conveyors and are carried through the washing device and subsequently stacked within a movable container.

As will be seen from FIGS. 1A and 7, the large trays 20 move along the conveyor 188 passing through the washing device 42 while the smaller trays which are emptied on the opposite side of moving floor 176 are picked up by an additional conveyor 198 for movement through the washer 42. As will be seen from FIG. 1A, two such units each handling both large and small trays are preferably installed in one installation for increased capacity.

The deposited chinaware, silverware and food particles then pass along conveyors such as designated 176 until they are channeled into a single movable unit 46 by means of a series of lateral conveyors 200 which communicate with the movable floors extending from the tray inverting devices. Consistent distribution of dishes and food particles over the entire width of the conveyor is accomplished by means of a plurality of inclines 202, 204 and 206 so that, for the most part, the silverware and chinaware articles are evenly distributed across the grid 48 of the silver separator 46. As food, chinaware, and silverware articles move along conveyor 44, those articles positioned on the right side of the conveyor will flow down incline 202 and be deposited along the right side of conveyor 200. The articles positioned along the left side of conveyor 44 will fall directly onto the left side of conveyor 200 for movement onto the separator 46. Inclines 204 and 206 work similarly to provide a consistent and even spreading of articles on the grid 48.

Grid 48 is a movable wire conveyor having openings sufficient to allow passage of silverware articles which, when passed, fall onto an underneath conveyor 208 for movement parallel with conveyor or separator 46. The silverware articles then are deposited from conveyor 208 onto an intersecting conveyor 52 which will lead to the magnetic classifying stations and subsequent washing operations.

As all articles of silverware along with food particles move along conveyor 52, they eventually move under a first magnetic station 54 which is comprised of a movable conveyor belt 210 within which is positioned a permanent magnet 212. The magnet will attract all silverware articles since these articles do contain magnetically attractive particles of one form or another. A movement (see arrow) of conveyor 210 then will carry the attracted articles to a parallel conveyor 56 where they will be deposited at the end of the magnet 212. Note that the food particles are not attracted by the magnetic field established by magnet 212 and thus remain on conveyor 52 and are carried forwardly to a pulper or pulverizing unit 60 for disposal.

The movement of conveyor 56 carries all of the unclassified silverware articles which are, in varying strengths, magnetically attractive to a magnetic station 62. At this station, because of the rotation of the conveyor 214 of unit 62 (see arrow), and because of the particular magnetic field strength established by magnet 216, only the spoons will be attracted to the surface of the conveyor 214 by reason of the magnet 216. These articles will be moved laterally to a single conveyor 64 where they will then be deposited as the magnet ends.

Thus after the articles have passed magnetic station 62, two conveyors will then be moving in a side-by-side relation, the first conveyor 64 will carry only spoons and the second or original conveyor 56 will carry the mixed knives and forks.

The mixed knives and forks then pass through another magnetic station 68 comprising a conveyor 218 surrounding magnet 220 which has a strength sufficient to attract the forks from conveyor 56 and move (see arrow) those forks to another parallel conveyor 70. The three parallel conveyors 64, 56 and 70 carry like articles of silverware into and through a washer 66 for subsequent accumulation in bins 72. The separation of silverware articles by the various magnetic stations is achieved by varying the strengths of the magnets 212, 216 and 220 to cause responsiveness from individual articles of silverware which have been varied in magnetically attractive material content to respond to the particular fields. By a correct balancing of the strength of the magnetic field with the quantity of magnetically responsive articles within each article, any number of variations may be achieved in the movement and separation of the various items of silverware.

The articles of chinaware that are retained on grid 48 of separator 46 are moved through a pre-wash unit 50 where they are subjected to a high water velocity pre-wash (not shown) from a variety of directions which washes away the majority of disposable and waste food items. The articles then move from the pre-wash unit along conveyor 74 and approach the automatic plasticware separating device or station 76. This station is comprised of a conveyor 222 surrounding a permanent magnet 224, and functions so that all articles of chinaware which contain any magnetic particles are removed from conveyor 74 (see arrow) and deposited on a parallel conveyor 96 for subsequent movement through the magnetic sorting system. Those non-magnetic articles retained on conveyor 74 move to a secondary pre-wash or scraping device 78 to assure maximum efficiency in removal of waste foods and other disposable items from the chinaware.

As the non-magnetic chinaware moves onto conveyor 84, a series of separators 86 and 88 are angularly positioned across the conveyor to permit passage of some articles of chinaware and block the passage of others so as to create a separating system based on the height of the articles involved. As can be seen in FIG. 13, the smaller, flatter dishes are allowed to pass beneath the first baffle 86 through an opening 226 while the larger dishes are precluded from passing through that opening and are diverted onto a by-passing conveyor 228 which will then position those articles on the parallel conveyor 90 described earlier. Thus, two parallel conveyor systems 90 and 92 are provided for the handling of non-magnetic chinaware articles that are subsequently introduced into the washer 94 and eventually accumulated at the terminal ends 230 of the conveyors where attendants manually remove those dishes and store them for subsequent use.

The magnetically responsive chinaware transferred at station 76 to conveyor 96 is then moved forwardly toward the magnetic sorting device, but a spreading technique is necessary to eventually achieve a sequential introduction of the articles involved into the sorting apparatus. Accordingly, a spreader 98 in the form of a stainless steel rake temporarily holds back higher chinaware items though it ultimately allows them to pass beneath the tines of the rake so that the articles are rather consistently spread over the conveyor 96. Two guide or directing rails 232 and 234 funnel the chinaware items down to single file conveying to the sorting apparatus. A portion of the magnetic sorting apparatus functions by mechanical means in that the articles of lower height pass beneath baffle 104 and move along an inclined ramp 236 which causes the plates contained thereon to ride against the rail 238. At least two slots 240 and 242 of selective depth allow plates of varying height to pass therethrough and down a further incline 244 into idividual conveyor lines 106, 108 and 112. Those plates that do not fall within either of the slots 240 or 242 move along the incline 236 and eventually form the conveyor 112 for subsequent movement through the washer 114.

Those magnetically responsive articles having a slightly greater height than the plates previously sorted, contact baffle 104 and move along it and down an incline 246 and into a first conveyor 130 where all articles are moved forwardly toward magnetic station 124. This station contains a conveyor 248 surrounding a permanent magnet 250 and functions similarly to those previously described in the silverware sorting apparatus. At the first station 124, one particular article, in this embodiment the cereal bowl, is removed from conveyor 130 and moved over to conveyor 136 because of the particular strength of the magnet 250 and the number of magnetically attractive particles contained within that particular article. The articles then continue to move through conveyor 130, except those bowls which have been deposited in conveyor 136 by station 124, until another magnetic station 126 is encountered. Here a second series of similar chinaware articles, in this case the coffee or tea cups, are removed, because of their magnetic particle content, from conveyor 130 and transferred to conveyor 134 as previously described. The final magnetic station 128 lifts the tumblers from conveyor 130 and places them in conveyor 132 so that all magnetically responsive chinaware articles are now segregated into various conveyors which move in unison into the washer 114.

As all articles, both non-magnetic and magnetically responsive chinaware emerge from washer 114, each of the conveyors terminate in collecting bins 116, 118, 120, 138, 140, 142 and 144 where they are eventually removed and stored for subsequent use.

While there has been described with particularity a magnetic sorting method for segregating, washing and collecting articles of chinaware and silverware and one embodiment of a scullery system specifically designed for an installation of a given size and space configuration, it will be obvious that any facility may be provided with such a unit embodying the novel features set forth herein by designing the facilities to be accommodated within the space available.

I claim:
1. A scullery system for classifying, cleaning and collecting magnetically responsive tray-carried culinary items comprising: means removing chinaware from carrying trays; magnetic means classifying chinaware items according to like articles and isolating said classified articles each from the other; means cleansing said classified articles; and means for collecting commonly classified like articles.

2. A scullery system as claimed in claim 1 further comprising means separating chinaware from silverware items; and magnetic means classifying silverware items according to like articles and isolating said classified articles each from the other.

3. A scullery system as claimed in claim 1 wherein said chinaware removing means includes means for removing silverware from carrying trays simultaneously with the removal of chinaware.

4. A scullery system as claimed in claim 3 wherein said chinaware removing means includes a tray inverting conveyor means dislodging said carried chinaware and silverware items from the carrying trays and moving the trays to a remote location for subsequent washing and collection.

5. A scullery system as claimed in claim 2 wherein said chinaware and silverware separating means includes grid conveyor means adapted to pass silverware items therethrough while restraining chinaware items thereon for movement along a directed path of travel.

6. A scullery system as claimed in claim 2 wherein said magnetic silverware classifying means includes a plurality of magnetic sorting stations having varying magnetic fields of strength, each of said stations adapted to attract and transport like articles of silverware to a common item-collecting location, each of said articles containing a quantity of magnetically attractive material sufficient to respond to the magnetic strength of a given sorting station.

7. A scullery system as claimed in claim 2 wherein said magnetic chinaware and silverware classifying means includes a plurality of magnetic sorting stations of varying magnetic strength, each of said stations adapted to transport like items of chinaware and silverware to a common item-collecting location, each of said articles containing a quantity of magnetically attractive material sufficient to respond to the magnetic strength of a given sorting station.

8. A scullery system as claimed in claim 7 wherein said chinaware and silverware items upon separation are simultaneously sorted and subsequently cleansed and collected by said chinaware and silverware cleansing means and said collecting means.

References Cited

UNITED STATES PATENTS

| | | | |
|---|---|---|---|
| 3,247,858 | 4/1966 | Kraeft | 134—63 XR |
| 3,339,564 | 9/1967 | Kraeft | 134—63 XR |
| 3,389,711 | 6/1968 | Slayton | 134—63 |
| 3,394,804 | 7/1968 | Reichel | 209—111.8 |

DANIEL BLUM, Primary Examiner

U.S. Cl. X.R.

134—63, 68; 209—111.8; 335—285, 302